(12) United States Patent
Has

(10) Patent No.: US 7,991,789 B2
(45) Date of Patent: Aug. 2, 2011

(54) METHOD AND ASSEMBLY FOR CREATING A DOCUMENT

(75) Inventor: Michael Has, Erding (DE)

(73) Assignee: Oce Printing Systems GmbH, Poing (DE)

( * ) Notice: Subject to any disclaimer, the term of this patent is extended or adjusted under 35 U.S.C. 154(b) by 665 days.

(21) Appl. No.: 11/916,700

(22) PCT Filed: Jun. 12, 2006

(86) PCT No.: PCT/EP2006/005626
§ 371 (c)(1),
(2), (4) Date: Dec. 6, 2007

(87) PCT Pub. No.: WO2006/131399
PCT Pub. Date: Dec. 14, 2006

(65) Prior Publication Data
US 2008/0172358 A1    Jul. 17, 2008

(30) Foreign Application Priority Data

Jun. 10, 2005   (DE) ................... 10 2005 026 887

(51) Int. Cl.
*G06F 7/00*  (2006.01)
(52) U.S. Cl. ........................ 707/784; 707/804
(58) Field of Classification Search ......... 707/803–804, 707/784
See application file for complete search history.

(56) References Cited

U.S. PATENT DOCUMENTS

| | | | |
|---|---|---|---|
| 6,766,362 B1 | 7/2004 | Miyasaka et al. | |
| 6,981,214 B1 * | 12/2005 | Miller et al. | 715/234 |
| 7,136,177 B1 * | 11/2006 | Bryan et al. | 358/1.15 |
| 7,136,178 B1 * | 11/2006 | Gupta et al. | 358/1.15 |
| 7,149,698 B2 * | 12/2006 | Guheen et al. | 705/319 |
| 2001/0043364 A1 * | 11/2001 | Messner et al. | 358/1.15 |
| 2003/0144853 A1 * | 7/2003 | Stehouwer et al. | 705/1 |
| 2003/0150908 A1 * | 8/2003 | Pokorny et al. | 235/375 |
| 2003/0150909 A1 * | 8/2003 | Markham et al. | 235/376 |
| 2003/0154144 A1 * | 8/2003 | Pokorny et al. | 705/28 |
| 2003/0155415 A1 * | 8/2003 | Markham et al. | 235/376 |
| 2003/0158795 A1 * | 8/2003 | Markham et al. | 705/28 |
| 2004/0031058 A1 * | 2/2004 | Reisman | 725/112 |
| 2004/0056902 A1 * | 3/2004 | Rekimoto | 345/848 |
| 2004/0133487 A1 * | 7/2004 | Hanagan et al. | 705/34 |
| 2004/0249712 A1 * | 12/2004 | Brown et al. | 705/14 |
| 2005/0021404 A1 | 1/2005 | Schoder et al. | |
| 2006/0116918 A1 * | 6/2006 | Flora et al. | 705/8 |

FOREIGN PATENT DOCUMENTS

| | | |
|---|---|---|
| DE | 101 61 684 | 7/2003 |
| DE | 103 00 071 | 7/2004 |
| EP | 0 917 075 | 5/1999 |
| WO | WO 00/75768 | 12/2000 |

* cited by examiner

*Primary Examiner* — James Trujillo
*Assistant Examiner* — Linh Black
(74) *Attorney, Agent, or Firm* — Schiff Hardin LLP

(57) ABSTRACT

In a method or system for generation of a document, at least personal data and a characteristic value are stored in at least one data bank, at least the characteristic value being associated with the personal data. Document data are selected dependent on the stored characteristic value, at least a portion of the document being generated with aid of the selected document data. Information about a point in time is associated with at least a portion of the document data. A time span is preset so that the document data are only selected to generate the document when the time span comprises the point in time associated with the document data.

7 Claims, 3 Drawing Sheets

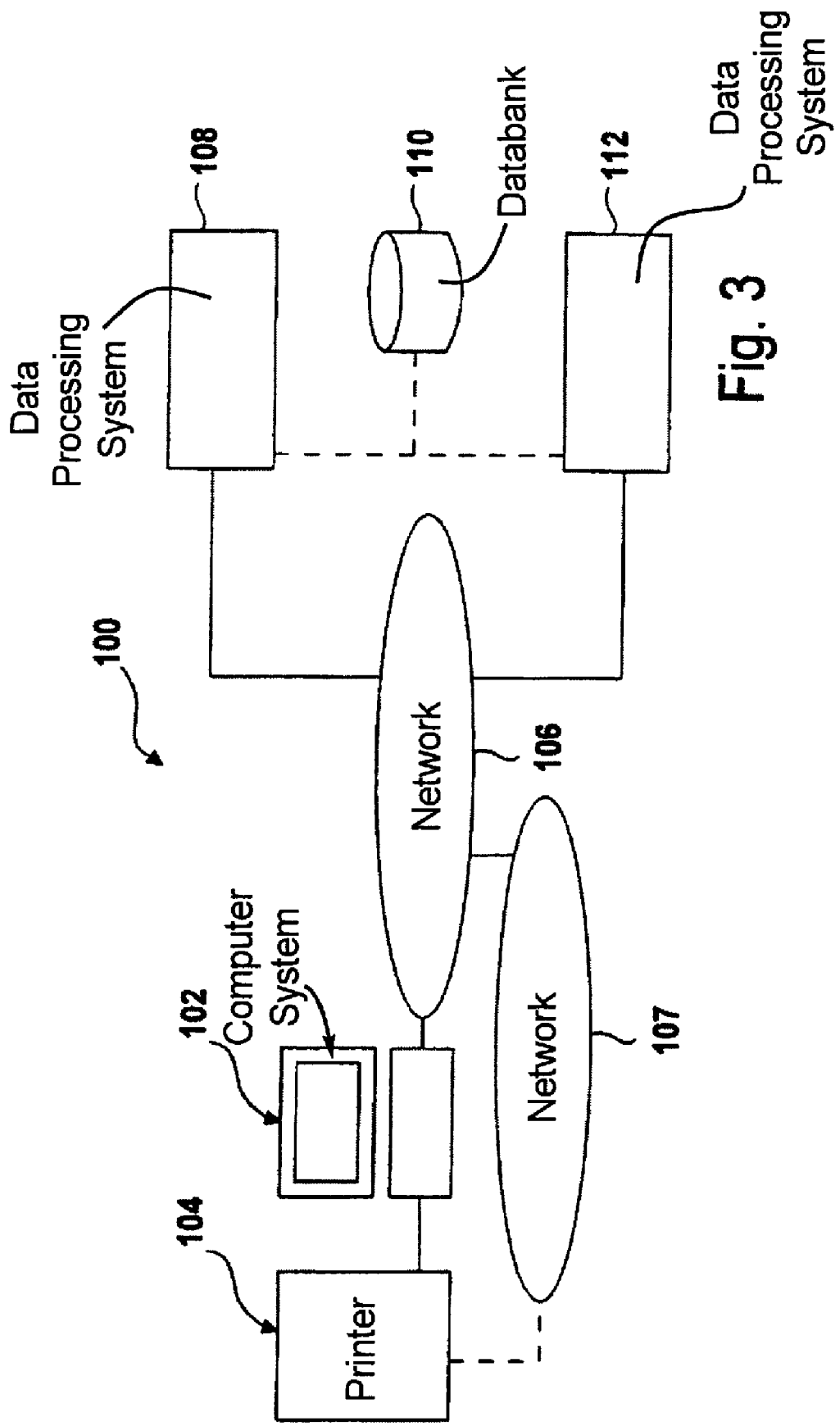

METHOD AND ASSEMBLY FOR CREATING A DOCUMENT

BACKGROUND

The preferred embodiment concerns methods and arrangements for generation of a document in which at least personal data of a person and a characteristic value are stored in at least one databank, whereby at least the characteristic value is associated with the personal data. The document data are selected dependent on the stored characteristic value, whereby at least a portion of the document is generated with the aid of the selected document data.

Via modern printing systems (in particular via electrophotographic high-capacity printers) a possibility has been achieved to also presently generate non-personal print products (and in the future personal print products such as, for example, a personal newspaper).

However, the selection of information for generation of a personal document is difficult. A targeted selection of this information is, however, required in order to generate a document with information suitable for the recipient and thereby to efficiently utilize the advantages of a personal or personified document.

A system and a method for production of a customer-individual print product dependent on a topic selection and the specification of a purchase price by the customer are known from the document DE 101 61 684. A dynamic adaptation of a customer profile associated with the customer is also provided.

SUMMARY

It is an object to specify a method and an arrangement for generation of a print product via which a suitable selection of document data for generation of the print product is possible. It is also the object of the invention to specify a method and a device for shipping of print products in which print products can be shipped cost-effectively.

In a method or system for generation of a document, at least personal data and a characteristic value are stored in at least one data bank, at least the characteristic value being associated with the personal data. Document data are selected dependent on the stored characteristic value, at least a portion of the document being generated with aid of the selected document data. Information about a point in time is associated with at least a portion of the document data. A time span is preset so that the document data are only selected to generate the document when the time span comprises the point in time associated with the document data.

BRIEF DESCRIPTION OF THE DRAWINGS

FIG. 3 illustrates a block representation of a system for transfer of data dependent on a printer.

DESCRIPTION OF THE PREFERRED EMBODIMENTS

Figure 1:
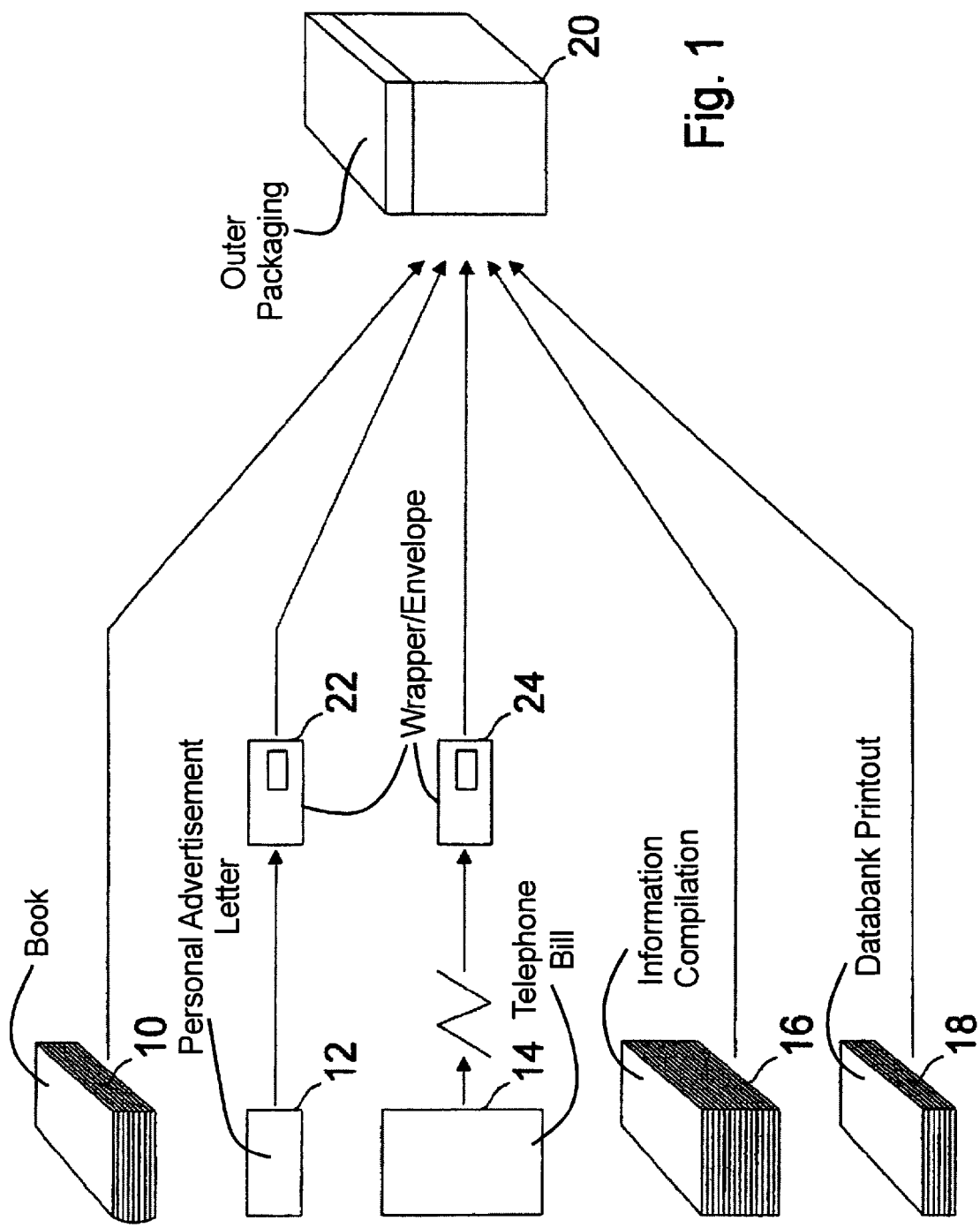
FIG. 1 is a schematic representation of a plurality of print products to be jointly shipped according to a first exemplary embodiment of the invention.

For the purposes of promoting an understanding of the principles of the invention, reference will now be made to the preferred embodiments and best nodes illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

Via a method of a preferred embodiment, document data with which information about a point in time has been associated can be selected via presetting of a time span in a simple manner. A simple and comfortable selection of the document data for generation of the document is thereby also automatically possible, whereby a document specified for the person is generated in a simple manner.

A second aspect of the preferred embodiment concerns an arrangement for generation of a document that has at least one databank in which are stored at least personal data and at least one characteristic value, whereby at least the characteristic value is associated with the personal data. The arrangement also concerns a data processing system that selects at least document data dependent on a stored parameter and provides at least a portion of the document data for generation of the document. Information about a point in time is associated with at least a portion of the document data. A time span is also preset in order to read out only the document data whose associated point in time is comprised by the time span.

Via this arrangement it is achieved that, in a simple manner, document data are selected whose associated point in time is contained in a preset time span associated with the person. The document to be generated is thereby generated dependent on the preset, personal time span in that only the document data are selected whose associated time span is comprised by the preset time span.

A third aspect of the preferred embodiment concerns a method for shipment of print products in which a copy of an edition of a regularly appearing first print product is prepared; a second print product is added to the first print product, whereby at least the second print product comprises personal data. The first print product is shipped together with the second print product.

Via this method the shipping of the print products is cost-effective since the two print products are shipped together, whereby in general lower postage and shipping fees are incurred. An address information connected with the first print product is not a second print product in the sense of the preferred embodiment. The second print product can, for example, comprise a letter directed to the recipient of the print product or an offer directed to the recipient. The second print product can thereby comprise a single sheet, a plurality of single sheets or single sheets connected with one another.

A fourth aspect of the preferred embodiment concerns a device for shipment of print products that has a first unit for provision of a copy of an edition of a regularly appearing print product. The device also has second unit for addition of a second print product to the first print product, whereby at least the second print product has personal data. The device also comprises third unit for joint shipment of the first and the second print products. Via this device it is achieved that the two documents can be cost-effectively shipped together since in general the individual shipping of two print products is more expensive.

A fifth aspect of the preferred embodiment concerns a method for shipment of print products in which a copy of an edition of a regularly appearing first print product is provided. At least personal data of a person and a characteristic value are stored in a databank, whereby at least the characteristic value is associated with the personal data. Document data are selected dependent on the stored characteristic value, whereby at least a portion of the second print product is generated with the aid of the selected document data. The first print product is shipped together with the second print product.

Via this method it is achieved that the expenditure for shipping of the two print products can be significantly reduced relative to the individual shipping.

A sixth aspect of the preferred embodiment concerns a device for shipment of print products with a first unit for provision of a copy of an edition of a regularly appearing first print product. The device also comprises at least one databank in which are stored at least personal data of a person and a characteristic value, whereby at least the characteristic value is associated with the personal data. The device has a data processing unit that selects document data dependent on the stored characteristic value, whereby the data processing unit generates at least a portion of the second print product with the aid of the selected document data. The device comprises second unit for addition of a second print product to the first print product and third unit for joint shipment of the first and second print products. With the aid of this device of the preferred embodiment, the costs for shipment of the two print products can be significantly reduced relative to the individual shipment of these two print products since both the packaging costs and the postage costs can be decreased.

A seventh aspect of the preferred embodiment concerns a method for requesting a document in which a first document is selected by a person. At least one topic group is also selected by the person from a plurality of available topic groups and a time span is established by the person. A second document with information of the selected topic group is furthermore requested by the person in the established time span, which second document is shipped together with the first document.

At least one first document adapted to the requests of the person is generated via a second method, which first document is shipped together with a second document. The first document is thus at least adapted via the selection and determination of the person and therewith has been personally adapted. Additional shipping costs are avoided via the joint shipment of the second document together with the first document.

An eighth aspect of the preferred embodiment concerns an arrangement for requesting a document that has a first unit for selection of a first document. The arrangement also has a second unit for selection of at least one topic group from a plurality of available topic groups. Furthermore, a third unit for establishment of a time span are provided. The arrangement comprises a fourth unit for composing a second document with information of the selected topic group under consideration of the established time span, whereby the second document is shipped together with the first document.

A ninth aspect of the preferred embodiment concerns a method for data transfer in which an identifier for identification of an image generation device is associated with the image generation device. Furthermore, an authorization information that is stored associated with the identifier in a databank is associated with the image generation device. The transfer of data from a data source is requested by the image generation device and/or by a data processing system connected with the image generation device. Before the transfer of the data the authorization information associated with the image generation device is determined and read out with the aid of the identifier of the image generation device. The data are only transferred from the data source to the image generation device or to the data processing unit when the transfer of the data is permitted via the read-out authorization information.

Via this method it is achieved that data are transferred dependent on the image generation device. This is, for example, advantageous when a software or a subscription for software is distributed as a package together with the image generation device and, for example, should be used only in connection with this image generation device. It is thereby ensured that an unauthorized usage of the software is prevented since in this case the data required for this are not transferred. These data can advantageously concern both the software itself and data for activating this software that has already been delivered with the image generation device.

The image generation device advantageously comprises a printing unit, in particular a printing unit based on an electrographic (for example electrophotographic) printing principle or inkjet printing principle. The transferred data can alternatively or additionally comprise data for printing of a print product and/or data for activating a one-time or permanent printing function for printout of a document delivered in an electronic form with the image generation device. The documents to be printed out can in particular be editions of a newspaper, a trade journal, loose-leaf collections and/or parts of serial works in electronic and/or printed form. These documents can be components of a subscription, in particular of a trial subscription.

A tenth aspect of the preferred embodiment concerns a device for data transfer that comprises an image generation device with which an identifier is associated for identification. The device also comprises a databank in which an authorization information associated with image generation device is stored associated with the identifier of the image generation device. A first data processing system provides data. A data transfer path is also provided via which the image generation device and/or a second data processing system connected with the image generation device transfers request data that initiate the transfer of the data provided from the first data processing system. The first data processing system reads the authorization information associated with the image generation device out from the databank before the transfer of the data. The first data processing system transfers the data to the image generation device and/or to the second data processing system only when a transfer is allowed by the read-out authorization information.

Via this device it is ensured that the data are transferred from the first data processing system to the image generation device and/or to the second data processing system only when a corresponding authorization information is associated with the image generation device. Further advantages of this the preferred embodiment have already been described in connection with the ninth aspect of the preferred embodiment.

An eleventh aspect of the preferred embodiment concerns a method in which a device with a printing function is delivered bundled together with a right to obtain a further product.

Via this method a purchase incentive to purchase the device can be achieved via the further product. Products (in particular products of information service providers or publishers), publications such as software publications, databank usages, usage rights for electronic information sources or online portals or print products can also be distributed via the same distribution path as the device. It is thereby particularly advantageous when the product is a test version and/or a trial subscription for whose delivery and/or usage the customer must register with the manufacturer and/or marketer of the product and in particular must authenticate with the aid of an identifier of the device or with the aid of a code supplied with the device. This trial sample can lead via a separate contract or implied contract to a permanent, indefinite subscription. The manufacturer and/or marketer of the end device can correspondingly participate in the gain achieved via the delivery of further products (in particular via a subscription).

A schematic representation of a plurality of print products 10 through 18 that are shipped to a recipient together in a joint outer packaging 20 is presented in FIG. 1. The print products comprise: a book 10; a personal advertising letter 12; a telephone bill 14 directed to the recipient; a compilation of various travel offers of one or more travel businesses that are compiled according to a specification and/or selection by the recipient; as well as printouts 18 with results of a databank inquiry. The print products 10 through 18 are packed together in a carton 20 serving as an outer packaging, whereby the personal advertising letter 12 is additionally protected with the aid of a first envelope 22 and the telephone bill 14 is additionally protected with the aid of a second envelope 24.

The envelopes 22 and 24 are advantageously sealed in the outer packaging 20. The book 10 is advantageously a book from a regularly appearing serial series (such as, for example, a serial volume of an encyclopedia series) or a book subscription (advantageously a book club). Alternatively or additionally, further documents can be shipped together with one document or with multiple documents 10 through 18, such as, for example, a compilation of job advertisements with content predetermined by characteristic values that appear and/or are assigned in a time span predetermined by the recipient.

The time span can in particular be established such that a weekly compilation, a monthly compilation or a daily compilation of articles or advertisements of preset topic groups are compiled and shipped. Targeted advertising offers such as, for example, the travel information 16 can also be specifically aligned to the requests of the recipient or a consumer group with which the recipient is associated. Very targeted advertising is thereby very efficiently and cost-effectively possible since the recipient is not flooded with advertising that is not of interest to him and thereby pays more attention to the targeted advertising. The recipient also has the feeling of obtaining advertising that is useful to him.

Via the shipment of further documents (such as, for example, the telephone bill 14) together with the book 10, in particular publishers that have their own shipping network or enlist the cited services can print the telephone bill 14 and ship it to the recipient together with the book 10 in the same outer packaging 20. A new market is thereby made accessible to the publishers, whereby no additional costs are incurred for delivering telephone bill 14. The delivery of the telephone bill 14 thus occurs very cost-effectively.

Figure 2:
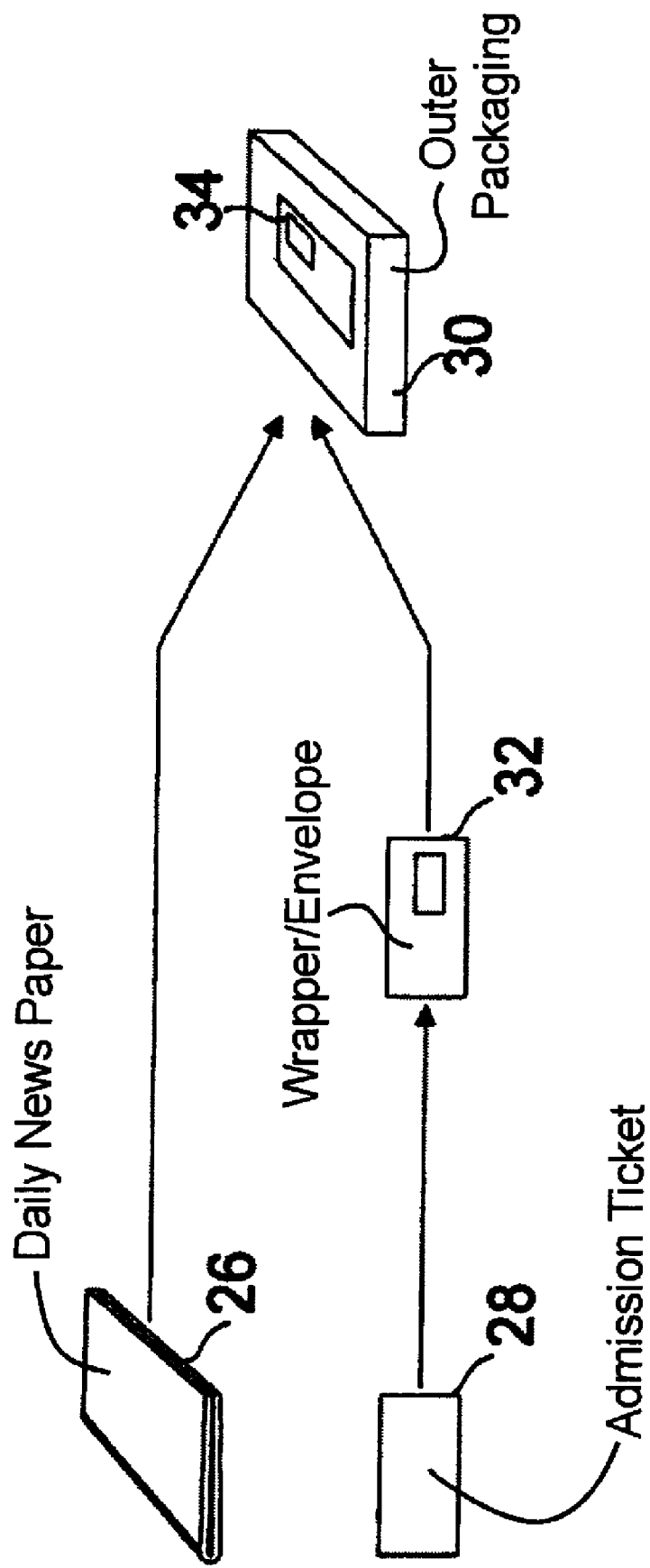
FIG. 2 shows a schematic representation of a plurality of print products to be jointly shipped according to a second exemplary embodiment of the invention.

A schematic representation for shipment of two documents 26, 28 in a common outer packaging 30 is shown in FIG. 2. The first document is a daily newspaper 26 and the second document is an admission ticket 28 that is additionally packaged in an envelope 32 that is placed into the outer packaging 30 together with the daily newspaper 26. The outer packaging 30 comprises an address label 34 that bears the address information of the recipient as well as the sender information of the shipper.

Alternatively, the envelope 32 can be connected with the daily newspaper 26, for example via an adhesive bond. The daily newspaper 26 then advantageously bears a separate address information. Alternatively or additionally, the envelope 32 can contain an address information of the recipient. Localized or personalized editions of newspapers and magazines are not cost-effectively possible, in particular in offset printing. For example, according to the preferred embodiment special subscriptions (in particular for professional readers) are additionally offered with newspaper subscriptions or magazine subscriptions, which special subscriptions, in addition to standard books, can be special articles regarding selected topics that are directed to the professional reader and/or readers. There is frequently a close cooperation or organizational association between newspaper publishers and specialized publishers (such as, for example, given the Süddeutschen Zeitung), whereby advantageous synergy effects arise.

The special subscriptions can also comprise additional databank services as well as databank connections. For example, one or more monthly databank inquiries can be offered to customers dependent on their occupation group and/or on a present topic group that they have indicated as being of interest. The results of these inquiries are then digitally printed and slipped into the edition of a regularly appearing print product or are added to this edition. Such regularly appearing print products can be daily newspapers, weekly newspapers, magazines or serial series of books (in particular of technical books). For example, the printed inquiry results can be shipped on the following day together with a daily newspaper to be delivered to the recipient. The delivery and distribution networks of daily newspapers and of magazines, which are already present in particular at larger publishers, can thereby be used.

Compilations of articles as a print product or as an electronic document that have appeared during a preset time span can also be generated for subscribers. This time span can in particular be a period of absence in which the subscriber has cancelled the subscription, for example for a time span of a journey. Corresponding to one or more present topic groups, articles that are associated with these topic groups are selected for this compilation. The recipient thereby receives a compilation of articles of particular interest to him that have appeared during his absence. This compilation is advantageously printed with the aid of a digital printing device or is provided to the recipient with the aid of a Web-based service.

Advertisements with contents of interest to the recipient can also be filtered out from all advertisements appearing in a newspaper or a magazine, sorted according to the requests of the recipient and delivered to the recipient as an electronic or printed document. For example, an automobile manufacturer can have job offers delivered to his rivals in order to obtain information about personnel requirements and requests of his competitors for sought personnel.

Furthermore, admission tickets can be generated with the aid of what is known as secure digital printing and be added to a regularly appearing print product. Alternatively, these admission tickets can be printed in a program of the event or can be slipped into this. This program can then be inserted as a special addition for this event into a daily newspaper that is to be delivered to the recipient. Alternatively or additionally, advertising specifically adapted to the recipient or advertising of a topic area of interest to the recipient can be slipped into the newspaper. The topic areas of interest to the recipient are advantageously stored in a databank. Advertising very specifically tuned to the area of interest of the recipient is thus also possible. A flooding of the recipient with advertising not of interest to him is thereby prevented.

In particular newspaper publishers possess a separate area-wide and efficient delivery service for physical goods that is independent of already-established postage and delivery services. The publishers traditionally deliver the daily newspaper early in the morning, i.e. before the working hours of employed readers and thus before the arrival of deliveries of other delivery services. Via a combination of the newspaper printing with documents generated in a digital printing that are specific to the same recipient (such as the printed newspaper), these documents can be delivered together to the recipient in a simple and cost-effective manner. With the aid of the digital printing, documents printed only shortly before the dispatch of the newspapers and directed to the recipient of the newspaper can thereby be printed out, placed in envelopes if applicable and then slipped into the newspaper. Further print products are thus then delivered together to the recipient. Alternatively, the newspaper and the further print product can be mutually packed in an outer packaging 20, 30 and then delivered to the recipient in this outer packaging 20, 30.

The insertion of one sheet or a plurality of sheets into a print product is generally designated as interleaving, whereby the sheet or the sheets are advantageously themselves a print product. The print products have in particular been generated at different points in time and/or with the aid of different printing devices.

A block representation of a system 100 for transfer of data is shown in FIG. 3. A computer system 102 that is generally also designated as a data processing system is connected with a printer 104. This connection can, for example, occur via a Centronix data interface, a USB data interface or another suitable data interface such as, for example, an Ethernet connection over a local area network. The computer system 102 is connected via a network 106 (LAN, WAN, Internet) with a data processing system 108 of an information provider (for example a publisher) that publishes and distributes, for example, information, works, articles, press releases, print products and/or software. The data processing system 108 of the publisher has access to databank entries of a databank 110 and can in particular write databank entries into the databank 110. The databank 110 can be provided by the manufacturer of the printer 104, by the publisher or by a service provider. Alternatively or additionally, the manufacturer of the printer 104 and the publisher can each use separate databanks between which data with regard to the printer 104 can in particular be exchanged in that the data sets that concern the printer 104 are synchronized in both databanks.

The databank 110 according to FIG. 3 is used both by the publisher and by the manufacturer of the printer 114. Such a databank 110 that is used by a plurality of users is also designated as a shared database. In the exemplary embodiment according to FIG. 3 the data processing system 108 of the publisher and the data processing system 112 of the manufacturer of the printer 114 are each connected with the databank 110 via a connection. This connection can occur via a local area network, a wide area network, in particular via the Internet. Given a connection over a public network, a secure data connection is advantageously established and utilized for data transfer. The connection of the data processing systems 108, 112 among one another and/or with the databank 110 can likewise occur via the network 106. The printer 104 advantageously has a further data connection to a second network 107 that is advantageously provided via the public power grid, in particular the mains supply. For data processing a high-frequency signal is overlaid on the alternating voltage of the public power grid, with the aid of which high-frequency signal data are transferred. Such a technique is designated as a power line data transfer. The network 107 advantageously has a data connection to the network 106 that is advantageously realized via a gateway. Data are transferred from the network 106 into the network 107 and from the network 107 into the network 106 via this gateway. A connection to a global network such as the Internet is also advantageously provided via the network 107.

The printer 104 is advantageously sold together with a software and/or a subscription to a databank access, a magazine or other print products. With the aid of the data processing system 112, the manufacturer of the printer 104 generates a databank entry with an identification number of the printer 104 and an authorization information. With the aid of this authorization information it can be determined which software and/or which subscription has been distributed together with the printer 104. Alternatively or additionally, this information can itself be contained in the authorization information and/or in the databank 110. The software and/or the subscription are advantageously a test version of the software or a trial subscription of a print product such as, for example, of a trade magazine. Additionally or alternatively, an access and/or activation code for activation of the software and/or for delivery of the subscription or of a separate print product can be contained in the printer 104, which access and/or activation code is advantageously stored in a memory of the printer 104 in the form of data.

After the delivery of the printer 104 and the usage of the printer 104 by an end customer, this can establish a data connection to the data processing system 108 either via the computer system 102 connected with the printer 104 or directly from the printer 104 in order to request the desired data. These data can comprise: the software; activation data for activation of a software already delivered with the printer 104; data for activation of a function already contained in the printer 104 but not activated; data for output of a print product, in particular for printout of the print product; and/or data for activation of the advertisement; and/or printing function regarding the advertisement; and/or for printout of a document. After the request for transfer of these data by the printer 104 and/or by the computer system 102, the data processing system 108 determines the identifier of the printer 104 that has advantageously been transferred to the data processing system 108 together with the request for the data.

The identifier can advantageously comprise: the serial number of the printer 104; the printer type; the printer manufacturer; a MAC address of the printer 104; and/or a code stored in the printer 104. The code can be electronically stored in the printer 104 or be provided to the user as corollary information regarding the printer, for example on a printed-out document. The data processing system 108 reads the authorization information of the printer 104 from the databank 110 with the aid of this identifier. The service for providing the data via the data processing system 108 is advantageously limited to a time span after the purchase of the printer 104 and/or after the activation of the printer 104 at the end customer. If such a limitation is provided, the data processing system 108 checks whether this time span has already expired. If that is not the case or if no time limitation is provided, the data processing system 108 checks whether the authorization information stored in the databank 110 regarding the printer 104 or its identifier comprises the right to receive the requested data.

If that is the case, the requested data are transferred from the data processing system 108 to the computer system 102 via the network 106 or alternatively from the data processing system 108 to the printer 104 via the network 106 further via the network 107. Document data can in particular be directly transferred to the printer via the direct network connection, which printer 104 then prints these out. These document data can, for example, be data for generation of a magazine or another print product that should be provided to the end customer once as a give-away and/or as a trial subscription and/or as a test copy. Via the direct connection to the printer 104 it can be ensured that the transferred data are not further duplicated in an unauthorized manner, whereby unauthorized users hold no access to the data. The data can thereby not be relayed to unauthorized users.

These products distributed with the printer 104, in particular subscriptions of magazines or other relevant print products or information services, can then be retrieved by the purchaser of the printer 104 as this has already been explained. These products are advantageously also usable independent of the user 104, for example at a computer via a control program (such as, for example, an Internet browser) running thereon, and their activation is in this case decoupled from the printer 104. Additionally or alternatively, current printer configurations can be overwritten with standard configurations, printer configurations can be checked and changed in the event that this is necessary and/or updates/upgrades of the printer software can be transferred to the printer 104 directly or via the computer system 102 with the registration or activation of the subscription.

The document data so provided can, for example, comprise printable data of newspapers, journals, magazines, school books and workbooks for classes, trade literature, in particular legal literature and serial legal works. A school book assortment, a technical book assortment, a serial series or a databank access to a scientific databank can thereby also be distributed together with a printer 104, whereby advantages result both for the publisher and for the manufacturer of the printer 104.

Alternatively or additionally, print products can be requested at the publisher via the data processing system 108, which print products are then shipped to the purchaser of the printer 104 via a conventional postal and/or package service. With the aid of the authorization information associated with the identifier of the printer 104 in the databank 110, the data processing system 108 of the publisher thereby checks whether the end customer of the printer 104 is authorized to request these print products. A time span can advantageously be provided in which the purchaser of the printer 104 or the printers 104 is authorized to request the documents and/or the data. After this time span a transfer of the data or a shipment of the documents no longer occurs.

A plurality of products can also be offered for selection to the end customer, which products are in particular distributed by various publishers. In this case it is advantageous when the data processing systems of each publisher have access to the databank 110 and the authorization for requesting the data and/or the documents can be checked with the aid of the authorization information stored there. The authorization information of the printer 104 in the databank 110 is then advantageously changed after the transfer of the data or after the shipment of the documents such that the sent data are not transferred again to the printer 104 or the shipped documents are not sent again to the purchaser of the printer 104.

In other exemplary embodiments it is additionally prevented that further data and/or print products available for selection are transferred after the request of a print product or of first data or of a specific number of print products or a specific data quantity of further data. The purchasing incentive for the printer 104 is increased via the preferred embodiment in that an additional product (in particular a subscription for magazines, newspapers, software and/or a databank access) is offered and distributed simultaneously with the purchase of the printer. The subscription can be continued automatically or via separate contract following such a trial subscription.

The printing device can in particular be equipped with additional functions such as a telefax transfer function, a scan function, a camera function, a telephone function and/or a copier function.

The exemplary embodiment described in connection with FIG. 3 can be advantageously combined with individual features and/or feature combinations that have been described in connection with FIGS. 1 and 2.

Although preferred exemplary embodiments/best modes have been shown and described in detail in the drawings and in the preceding specification, these should be viewed merely as purely exemplary and not as limiting the invention. It is noted that only the preferred exemplary embodiments are shown and described, and all variations and modifications that presently and in the future lie within the scope of protection of the invention should be protected.

I claim as my intention:

1. A method for generation and shipping of first and second print products for a particular person, comprising the steps of:
   storing an identification of a regularly appearing print product, separate regular editions of which occur at regular times and which the person desires to receive at those regular times as said first print product;
   also storing a time span selected by the person to define at least two documents to be included as the second print product, said at least two documents having respective associated different points in time;
   generating said first print product as said regular edition of the regularly appearing print product at one of said regular times;
   also generating said second print product for shipping together with said first print product at said one regular time, said second print product comprising said at least two documents from document data acquired by use of said characteristic value indicative of said topic group and also if said at least two document associated different points in time fall within said selected time span;
   also generating said second print product for shipping together with said first print product at said one regular time, said second print product comprising said one or more documents from document data acquired by use of said characteristic value indicative of said topic group and also if said one or more document associated points in time fall within said selected time span;
   adding said second print product to said first print product; and
   shipping said first print product together with said second print product to said person.

2. The method of claim 1 wherein said regularly appearing print product is an element selected from the group consisting of a daily newspaper, a weekly newspaper, a periodic magazine, and a book series.

3. The method of claim 1 wherein said second print product is an element selected from the group consisting of a compilation of articles, promotional items, and advertisements having individual respective points in time falling within said selected time span and also having respective topics falling within said topic group.

4. The method of claim 1 wherein the topic group is selected by said particular person from a plurality of topic groups.

5. The method of claim 1 wherein said particular person is a legal, natural, or virtual person.

6. The method of claim 1 wherein the second print product is inserted into the first print product, glued into the first print product, or is inserted into a wrapper connected with the first print product, or the first print product and the second print product are placed together in a common outer packaging.

7. A print product generation system for generating and shipping of first and second print products for a particular person, comprising:
- a storage having an identification of a regularly appearing print product, separate regular editions of which occur at regular times and which the person desires to receive at those regular times as said first print product;
- said storage also having personal data of the person and also a characteristic value associated with said personal data, said characteristic value defining a topic group comprising a plurality of topic areas of interest for the person in connection with said second print product;
- said storage also having a time span selected by the person to define at least two documents to be included as the second print product, said at least two documents having respective associated different points in time;
- a computer system and an associated printer generating said first print product as said regular edition of the regularly appearing print product at one of said regular times by accessing said storage;
- said computer system and printer also generating said second print product for shipping together with said first print product at said one regular time, said second print product comprising said at least two documents from document data acquired by use of said characteristic value indicative of said topic group and also if said at least two document associated different points in time fall within said selected time span; and
- said second print product being added to said first print product for shipping to said person.

* * * * *